(12) United States Patent  
Allen

(10) Patent No.: US 6,933,707 B2
(45) Date of Patent: Aug. 23, 2005

(54) FET CURRENT REGULATION OF LEDS

(75) Inventor: Mark R. Allen, Encinitas, CA (US)

(73) Assignees: Luxidein Limited, Encinitas, CA (US); Fiber Optic Designs, Yardley, PA (US)

(*) Notice: Subject to any disclaimer, the term of this patent is extended or adjusted under 35 U.S.C. 154(b) by 76 days.

(21) Appl. No.: 10/607,265

(22) Filed: Jun. 27, 2003

(65) Prior Publication Data

US 2004/0013139 A1 Jan. 22, 2004

Related U.S. Application Data

(60) Provisional application No. 60/391,670, filed on Jun. 27, 2002.

(51) Int. Cl.$^7$ ............................. G05F 1/40; H05B 37/02
(52) U.S. Cl. ....................................... 323/265; 315/294
(58) Field of Search .......................... 323/265, 266, 323/268, 270, 271, 273, 282, 293, 297, 908; 315/169.3, 185 R, 193, 291, 294, 307, 308

(56) References Cited

U.S. PATENT DOCUMENTS

| | | | | |
|---|---|---|---|---|
| 5,459,478 A | * | 10/1995 | Bolger et al. | 345/46 |
| 6,057,651 A | * | 5/2000 | Usami | 315/291 |
| 6,392,358 B1 | * | 5/2002 | Runau et al. | 315/185 R |
| 6,748,180 B2 | * | 6/2004 | Feng | 398/182 |

* cited by examiner

Primary Examiner—Matthew V. Nguyen

(57) ABSTRACT

Field Effect Transistors (FETs) are used to regulate current in a light emitting diode (LED). FETs are fundamentally voltage driven devices, where output current is governed by junction voltage. Since junction voltage can be controlled with little or no support circuitry, FETs present a solution to current regulation where cost, complexity, and perhaps even size are important.

11 Claims, 11 Drawing Sheets

FET CURRENT REGULATION OF LEDS

This non-provisional application claims the benefit of U.S. Provisional Patent Application No. 60/391,670 filed Jun. 27, 2002.

FIELD OF THE INVENTION

The invention relates to a system for current regulation of light emitting diodes using field effect transistors.

BACKGROUND OF THE INVENTION

Under analysis is a plurality of Light Emitting Diodes (LEDs) as shown in FIG. 1. With reference to FIG. 1, the voltage source may first undergo a voltage waveform transformation (e.g., AC to DC) before driving multiple series blocks of LEDs, where the M series blocks are connected together in parallel. Each of the M series blocks may have circuitry to control current. For conceptual convenience only a single series block of N LEDs is referred to throughout.

Diodes are well known in electrical engineering to be "current-driven" devices. In practice "current-driven" means that a large change in device current is produced by a small change in applied voltage. An ideal diode described in basic literature is the quintessential current-driven device since, in this ideal, an infinitesimal voltage change above a threshold produces infinite current. Real diodes have complicated internal behavior and, of course, finite current. Variations of internal behavior are taken advantage of to produce diodes of different types, such as Zener diodes. LEDs are diodes that produce light but otherwise are built to have common current versus voltage characteristics.

With their characteristic of rapid current increase as voltage rises above a threshold, LEDs are considered to require external current limiting to prevent damage or failure. It has recently been shown, for example in U.S. Pat. No. 6,461,019 "Preferred Embodiment to LED Light String" which is hereby incorporated by reference, that by matching waveform-dependent LED voltages to the stable source voltage, LED current can remain operationally stable without current limiting circuitry. While this "direct drive" approach is simple, inexpensive and electrically efficient, with no added power loss, there are also several drawbacks to this "direct drive" method.

One drawback to "direct drive" of LEDs is that the method of voltage matching requires a stable source voltage—this can often be met with AC line voltage (e.g., 120 VAC) but it may difficult to meet with batteries having large voltage droop. A second drawback to "direct drive" is inherent sensitivity to voltage variations. These voltage variations are of two primary types: source and device. An example of source voltage variation is difference in line voltage between, say, a place in California versus a place in Pennsylvania, where the latter often is several volts closer to the nominal 120 VAC value. Device voltage variations, found in any ensemble of LEDs, are differences in the current versus voltage characteristics from LED to LED caused by manufacturing. An example of device variation is shown in FIG. 2 where a 10% change in device voltage (for 20 mA nominal current) causes about 70% change in device current (for 2.0 VDC nominal voltage). Another drawback to direct drive of LEDs lies in design restriction, where the number N of LEDs used in the series block is strictly determined by voltage matching, with little variation about this number N.

Consider a series block of N LEDs directly driven with AC power, without current control or any voltage transformation in FIG. 1. The voltage and current of this unregulated AC circuit is shown for one period in FIG. 3. As the voltage increases above the diode threshold $V_{th}$ to its peak value, $V_{pk}$, and then falls back down again, the diode current rises sharply in a nonlinear fashion, in accordance to its current versus voltage response, to a peak value, $I_{pk}$, and then the LED current falls back down again to zero current in a symmetric fashion. The average LED current, $I_{avg}$ is obtained by integrating the area under this current spike over the period. With a typical value of average current at 20 mA, the peak current value is around 120 mA and the current pulse has an effective duty factor of around ⅙. This combination of peak current and duty factor for unregulated AC drive is stressful to common LEDs, lowering their reliability and longevity.

The stress due to an AC waveform can be reduced by transforming the voltage. A simple and inexpensive example is bridge rectification, resulting in the voltage and current shown in FIG. 4. Compared to the original AC waveform, peak current is halved to around 60 mA while effective duty factor is doubled to around ⅓; this lower peak value is particularly less stressful to common LEDs. With further waveform smoothing, such as by adding a capacitor across the rectifier output to create rippled DC, peak LED current is closer to average LED current and the devices are stressed even less. Nonetheless, without any LED current control the circuit remains sensitive to voltage variations discussed earlier.

LED current control is often implemented using passive impedance elements, most commonly as resistors. For AC or pulsed drive sometimes reactive components such as capacitors or inductors are considered advantageous for various reasons. This type of LED current control has been the subject of a variety of patents, notably in the early work of Okuno ("Light-emitting diode display, U.S. Pat. No. 4,298, 869, Nov. 3, 1981). The primary advantage offered by passive impedance elements is simplicity and cost. However, passive impedance elements are fundamentally soft limiters rather than hard limiters. A soft limiter exhibits current dependence on voltage whereas a hard limiter keeps current constant over a range of voltage.

The need therefore exists for a system for current regulation of a light emitting diodes.

SUMMARY OF THE INVENTION

The present invention uses Field Effect Transistors (FETs) to regulate LED current. FETs are fundamentally voltage driven devices, where output current is governed by junction voltage. Since junction voltage can be controlled with little or no support circuitry, FETs present a solution to current regulation where cost, complexity, and perhaps even size are important.

DETAILED DESCRIPTION OF PREFERRED EMBODIMENTS

Figure 1:
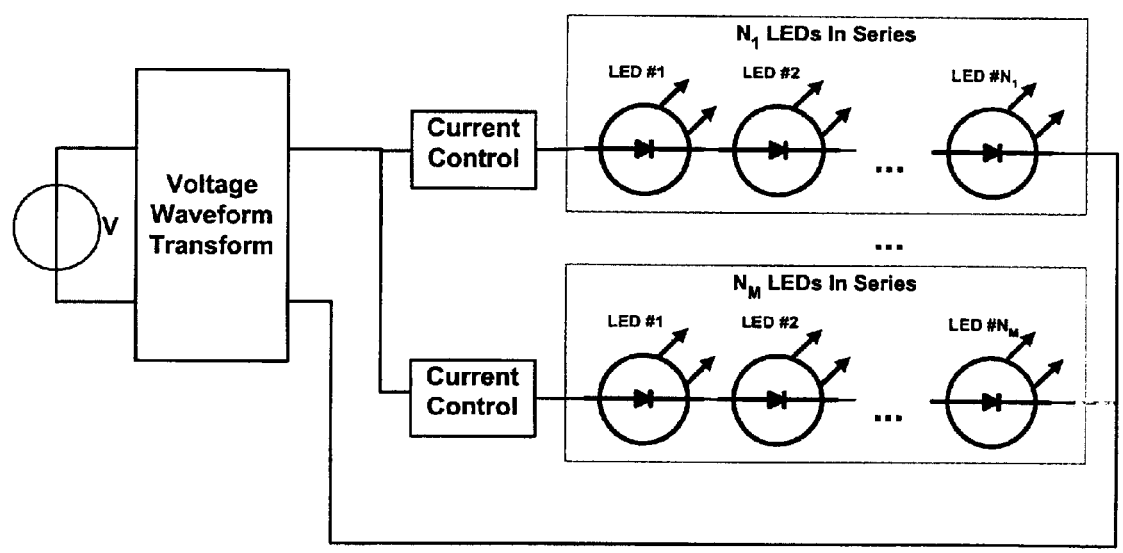
FIG. 1 illustrates a circuit comprising light emitting diodes.
Figure 2:
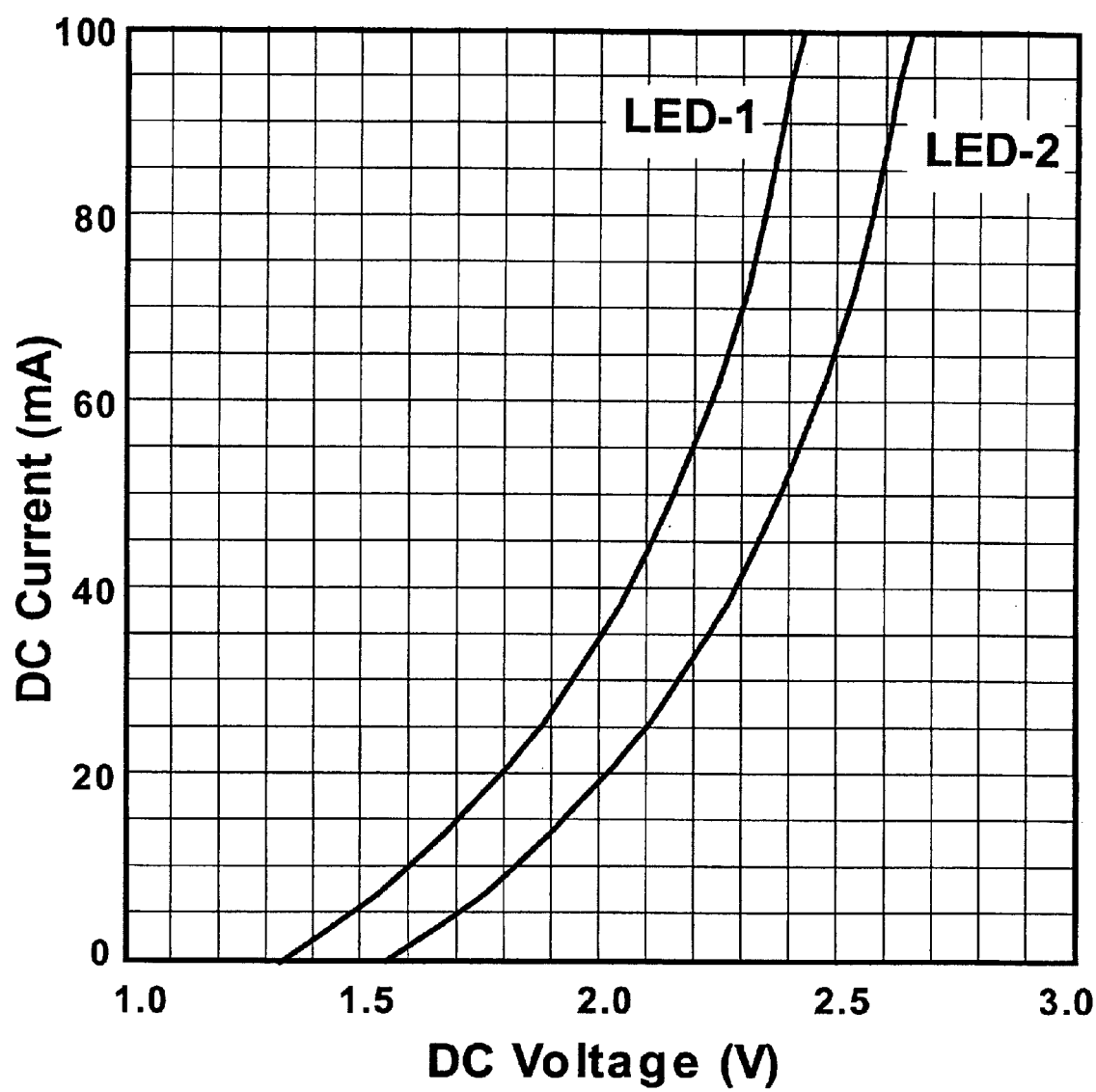
FIG. 2 shows one example of a device variation where a 10% change in device voltage (for 20 mA nominal current) causes about 70% change in device current (for 2.0 VDC nominal voltage).
Figure 3:
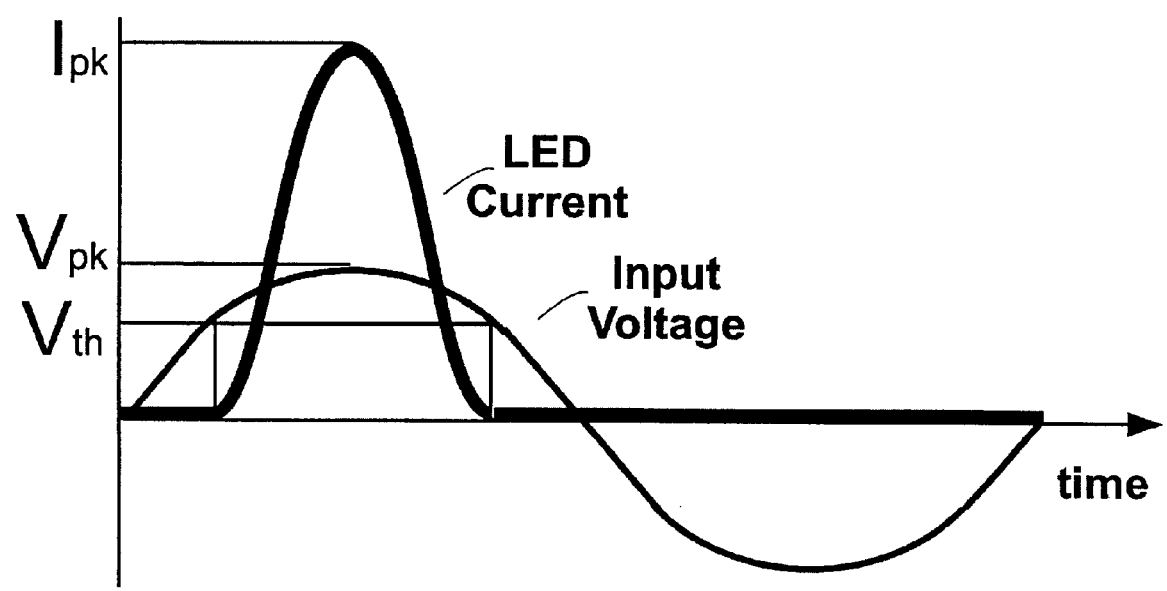
FIG. 3 illustrates the voltage and current of an unregulated AC circuit for one period.
Figure 4:
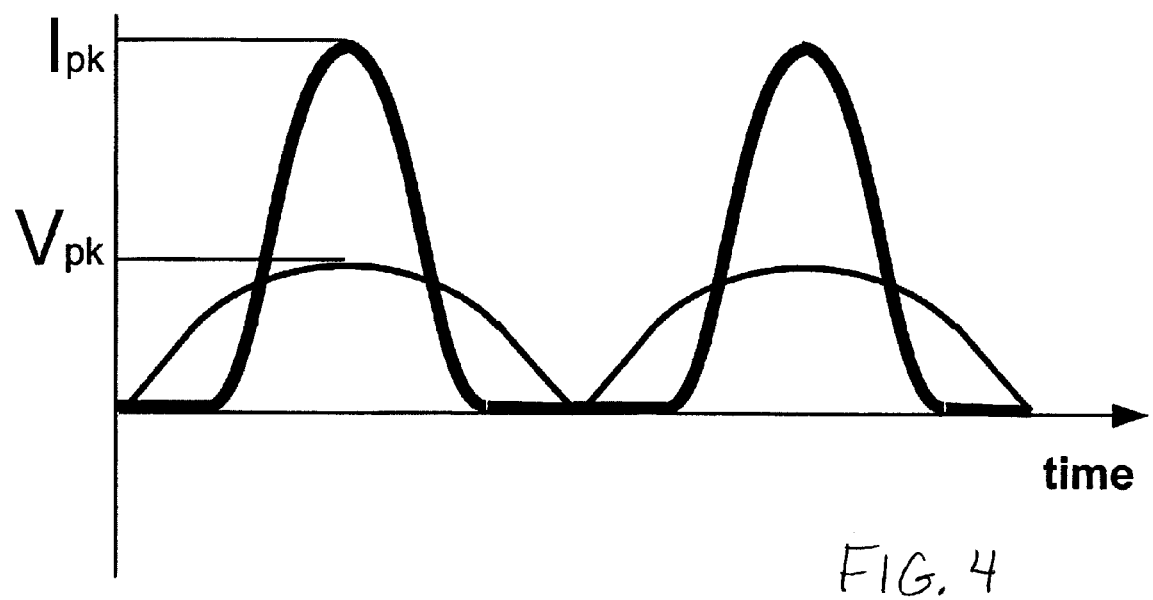
FIG. 4 illustrates a simple and inexpensive example of bridge rectification with resulting voltage and current.
Figure 5:
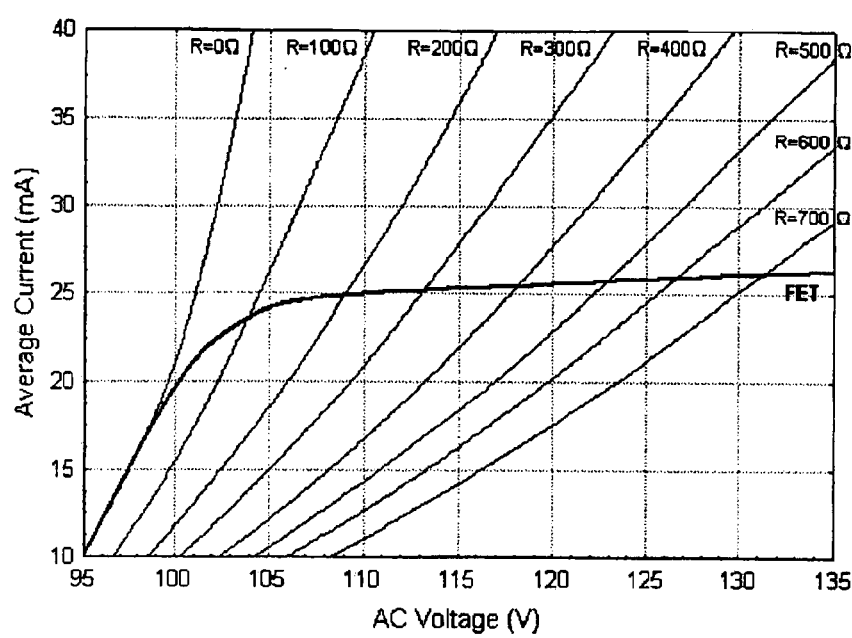
FIG. 5 shows parametric curves of current versus voltage for a fixed number of LEDs and different values of resistance in the AC circuit.

A resistor, for example, limits current only in proportion to voltage following Ohm's law. Such a linear, or ramp, function added to the LED circuit can only achieve a nearly linear response, with current nearly proportional to voltage, at large resistance. FIG. 5 shows parametric curves of current versus voltage for a fixed number of LEDs and different values of resistance in the AC circuit. As resistance increases and the circuit becomes less efficient, current becomes more linear to applied voltage and not a constant function. Since current is not held constant there is still some sensitivity to voltage variations. Thus these methods cannot fully regulate LED current to a (practically) constant value over a (practical) range of voltage.

FIG. 5 also shows a curve labeled "FET" that exhibits nearly constant current over a large range of voltage. This method of current control achieves practical current regulation by acting as a sufficiently constant current source over a wide range of voltage. The present invention uses Field Effect Transistors (FETs) to regulate LED current. Current regulation is a common circuit objective and many implementations exist in the art. Constant current sources can be built with high sophistication where the variations and associated voltage domains are both specified precisely. The present invention takes an opposite approach and is concerned mainly with simplicity and low cost. The preferred embodiment is comparable in simplicity and cost with passive element schemes yet, as FIG. 5 shows, it provides a practical means for full current regulation.

FETs are fundamentally voltage driven devices, where output current is governed by junction voltage. Since junction voltage can be controlled with little or no support circuitry, FETs present a solution to current regulation where cost, complexity, and perhaps even size are important. FETs come in two basic varieties, JFETs and MOSFETs, where MOSFETs have undergone considerable advancement in recent years. A variety of advanced MOSFET structures such as vertical DMOS are now available at low cost and in small packages.

Figures 6A, 6B, 6C, 6D:
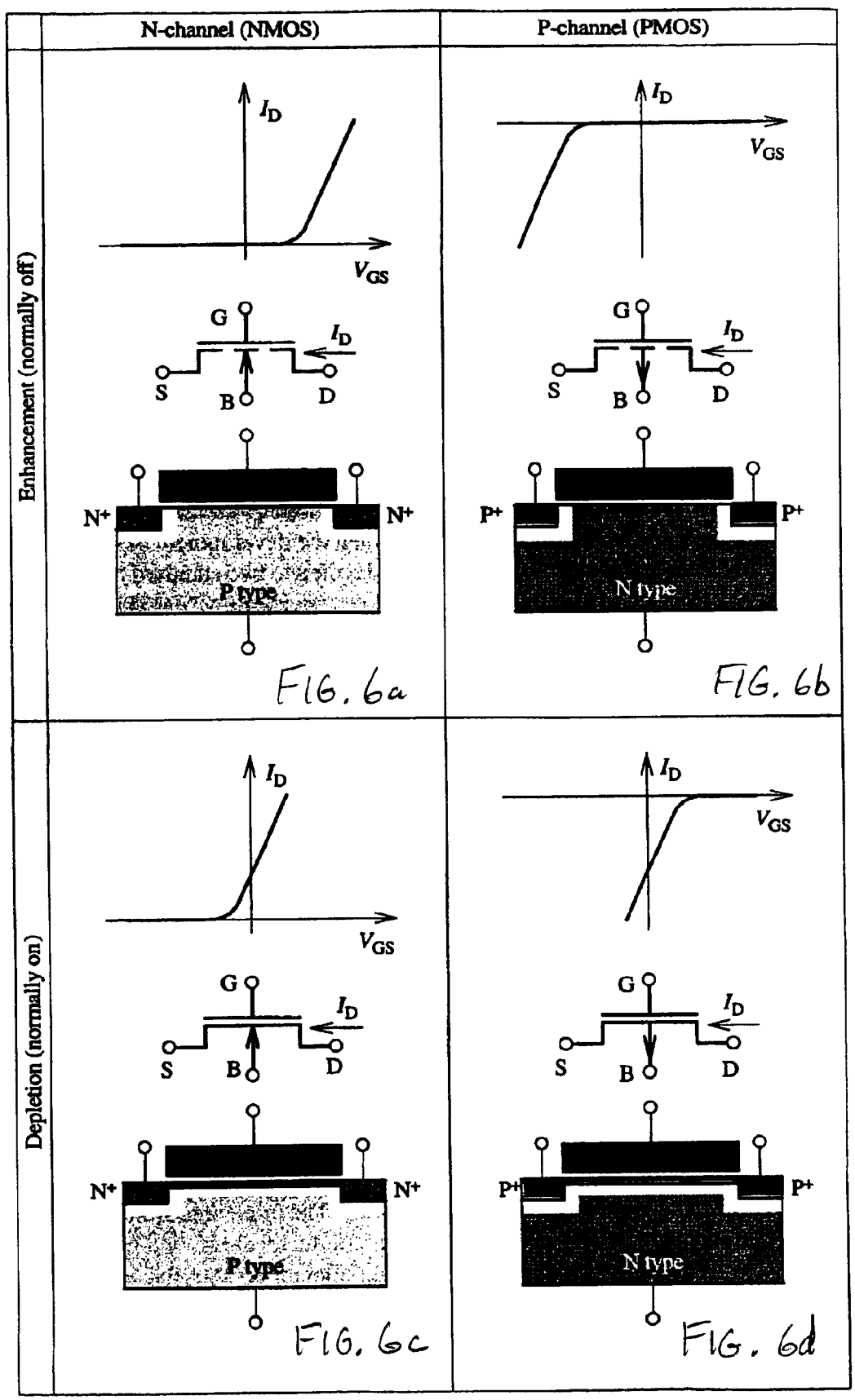
FIGS. 6a–6d schematically show the relations of FETs as either N-channel or P-channel and "depletion" type or "enhancement" type according to whether the device is on or off, respectively, with zero applied voltage.

FETs may be either N-channel or P-channel. In addition, MOSFETs may be either "depletion" type or "enhancement" type according to whether the device is on or off, respectively, with zero applied voltage, as shown in FIG. 6. To avoid circuit complexity or a separate voltage source, the preferred embodiment of this invention uses depletion FETs that are normally on when the voltage between FET Source (S) and Gate (G) is zero. JFETs fit into this "normally on" category, behaving essentially the same as depletion MOSFETs.

A typical set of FET output current versus input voltage curves, parametric in junction voltage, has two regions. An N-channel, depletion MOSFET is used in FIG. 7 to illustrate these regions—the three other MOSFET varieties exhibit similar properties with appropriate symmetry. Input Drain-Source threshold voltage $V_{DS(th)}$ determines the separation of these two regions, where $V_{DS(th)}$ depends on the designed Gate-Source voltage $V_{GS}$ and the fixed device Gate-Source threshold voltage $V_{GS(th)}$ along a device-dependent curve.

Figure 7:
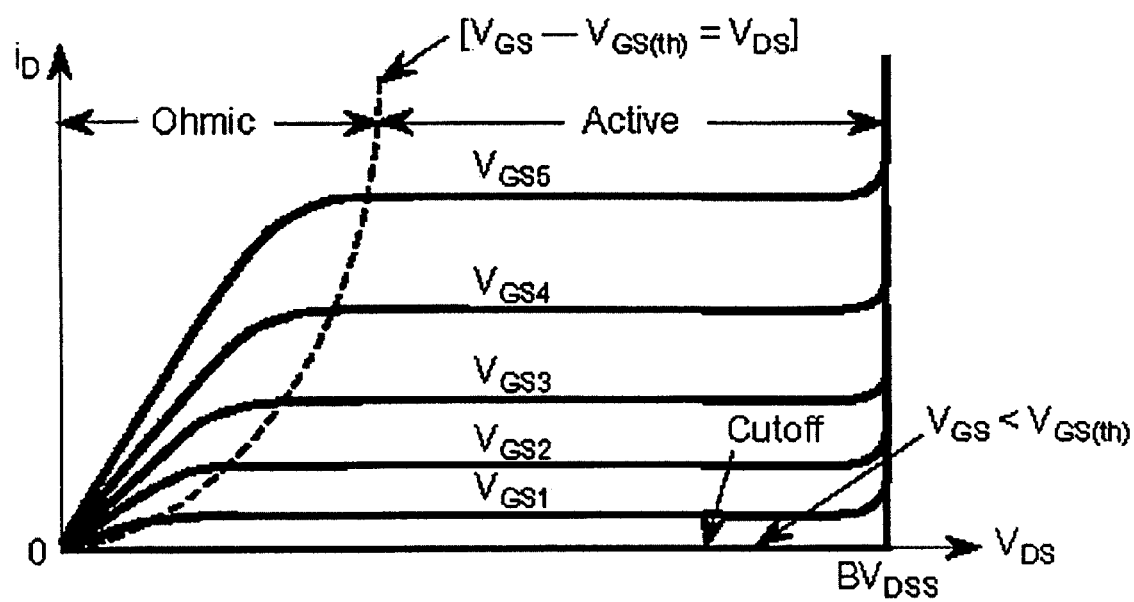
FIG. 7 illustrates the regions of a typical set of FET output current versus input voltage curves, parametric in junction voltage.

As FIG. 7 shows, below this Drain-Source threshold voltage, $V_{DS(th)}$, the N-channel depletion FET operates in a "Passive" region where its output (Drain) current $I_D$ rises with small input voltage $V_{DS}$, like a passive impedance device. If used in this region, the FET would act like a passive current limiter rather than an active current regulator. However, for values of $V_{DS}$ above the threshold $V_{DS(th)}$, the FET operates in its "Active" region, where output current $I_D$ becomes constant with larger input voltage $V_{DS}$. In this Active region, the FET serves as a current source to a series load, since the output current $I_D$ is determined solely by the FET internal junction voltage $V_{GS}$. The FET junction voltage $V_{GS}$ is easily be made constant by connecting the Gate and Source together. A resistor can be used for this connection to create a prescribed nonzero $V_{GS}$ voltage. If the connection is made directly without a resistor, then the case $V_{GS}$=0 results.

Figure 8:
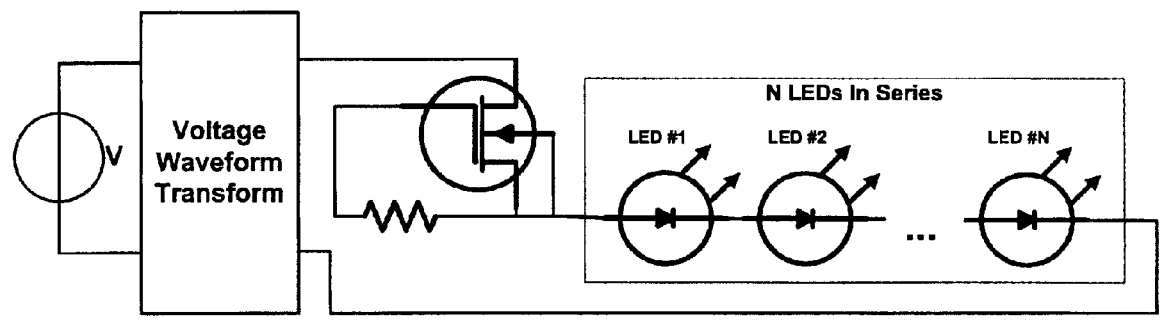
FIG. 8 illustrates a basic MOSFET current regulator having desired constant output current $I_D$ for any input voltage $V_{DS}$ within the active region.

The basic MOSFET current regulator, shown in FIG. 8, has desired constant output current $I_D$ for any input voltage $V_{DS}$ within the Active region. The voltage $V_{DS}$ in the Active region may be anywhere within a large voltage interval, for example, from as little as a few Volts up to as much as a few hundred Volts. The effect of the FET current regulator is to clamp the current to the maximum value of $I_D$ set by the Gate-Source voltage $V_{GS}$. The value of $V_{GS}$ is fixed by the FET device properties and the regulating resistor which, in turn, may be a simple wire or zero resistance. A JFET may be used instead of a MOSFET in FIG. 8 with the similar results. Moreover, the FET device parameters may be such that the resistor in FIG. 8 may not be necessary (R=0). Also, multiple FETs can be combined in parallel with their individual current values adding to form a sum total.

Figure 9:
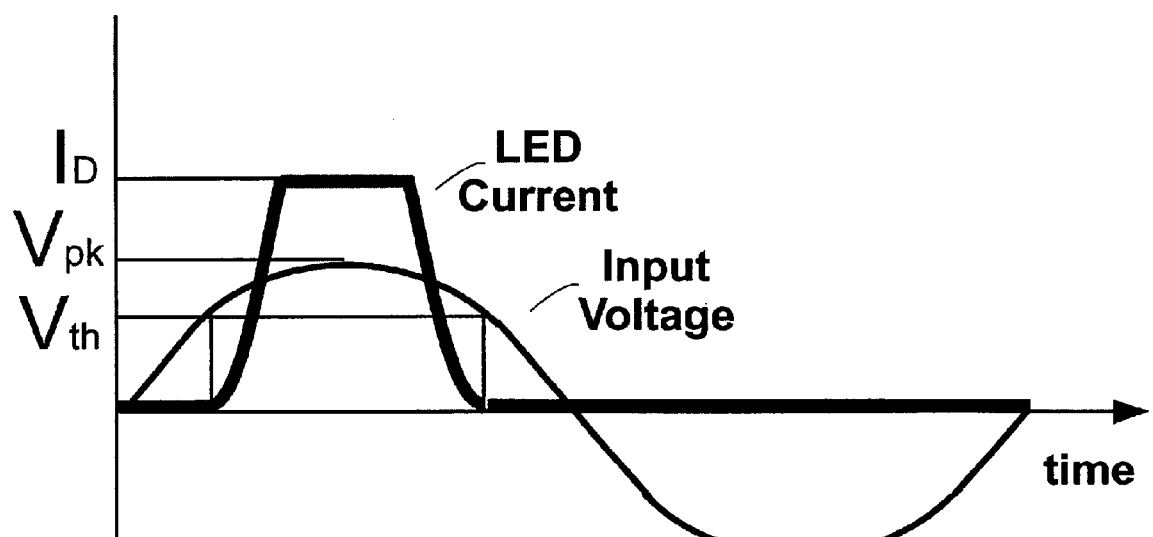
FIG. 9 illustrates that the FET imparts a hard limiting clamp to LED peak current at the value of $I_{DS}$.
Figure 10:
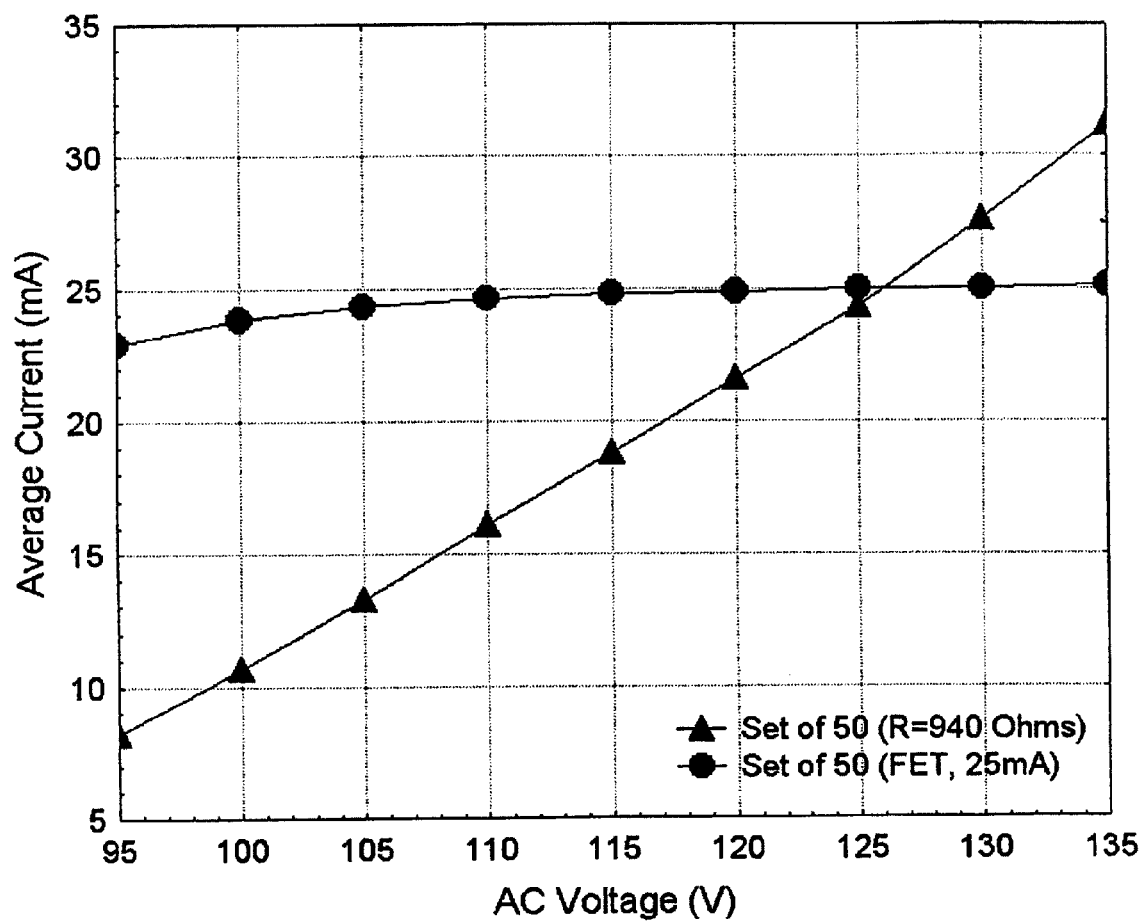
FIG. 10 compares a slight increase with a circuit controlled by a large resistor instead, where both circuits are designed for 25 mA average current at 125 VAC input.

Consider AC input with no voltage transformation in FIG. 8. The FET imparts a hard limiting clamp to LED peak current at the value of $I_{DS}$ as shown in FIG. 9. The LED current spike shape is nearly constant, and its peak value is regulated by the FET. Thus the average LED current becomes proportional to the regulated peak current, $I_D$. The ratio between the average LED current $I_{avg}$ and the FET current $I_D$ is the effective duty factor of the LED current spike. As voltage increases the width of this current spike increases slightly and hence the regulated current increases slightly. FIG. 10 compares this slight increase with the same circuit controlled by a large resistor instead, where both circuits are designed for 25 mA average current at 125 VAC input. For most applications the slight change in current from the FET is negligible and LED current is considered fully regulated to a practical constant value over the voltage range.

Figure 11:
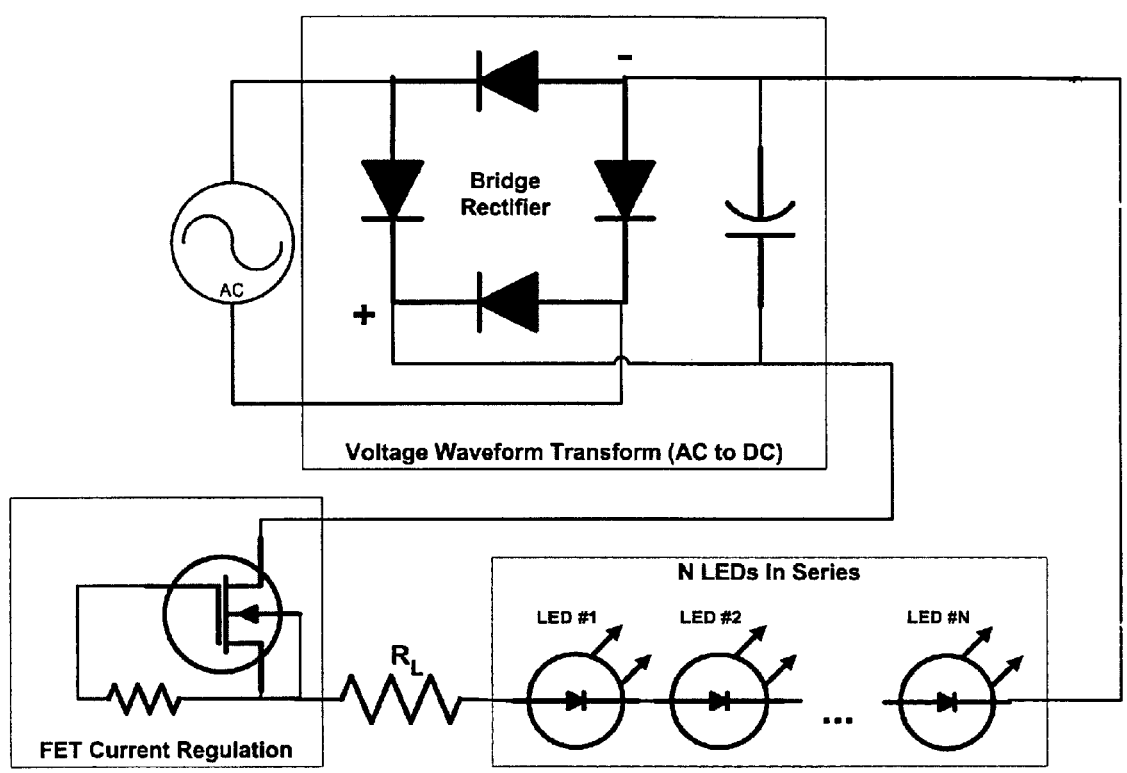
FIG. 11 shows the preferred embodiment of the FET current regulator of the instant invention.

As seen previously, the LED circuit with AC input and no voltage transformation has small effective duty factor which, in turn, yields a large ratio between peak and average current. The large peak current required for desired average current may stress the LEDs, lowering their reliability or longevity. It was also shown that rectification provides a simple means to decrease this stress—the bridge rectifier approximately doubles effective duty factor and halves the required peak current for the same value of average current. Moreover, better performance is further obtained by better approximating an AC to DC conversion through addition of circuit components to smooth the rectified output. One sufficiently large capacitor can suffice to reduce DC ripple to an acceptably low value. The resultant preferred embodiment to the FET current regulator is shown in FIG. 11. One or more JFETs or depletion MOSFETS can be combined in parallel to perform the current regulation of the one MOSFET drawn. Moreover, the MOSFET resistor may have zero value, depending on device parameters and desired LED current.

Note that FIG. 11 shows a load resistor having resistance $R_L$. This optional resistor can be used to offset some of the power dissipation through the FET for cases where the number N of LEDs is relatively small. In these cases the FET may dissipate significant power to regulate current even at low end of the voltage range, so the added load resistor merely absorbs some of this dissipated power by taking up some of the unneeded voltage. In this way FETs may be used that are rated at lower power dissipation or voltage range than would be possible to use reliably without the load resistor. Note also that for a DC input voltage, the AC to DC converter in FIG. 11 is not needed, and for a different type of input waveform other circuitry may be used to transform the waveform to DC, if so desired. In any case, the FET current regulator maintains the same basic hard limiting properties as described previously.

Finally, in theory one can achieve greater current control by cascading one or more FETs in series. With the devices being used in practice, however, the MOSFETs are already packaged into integrated circuits having excellent current control, and the extra cost associated with cascading FETs has not been found to be justifiable. Instead, the versatility of a single FET for many designs shows to be mainly a matter of packaging into a small enough but also thermally efficient enough device.

While the foregoing invention has been shown and described with reference to the preferred embodiments, it will be understood by those of skill in the art that various changes in form and detail may be made therein without departing from the spirit and scope of the invention.

What is claimed is:

1. A system for current regulation of a light emitting diode, said system comprising:
   a voltage source,
   a light emitting diode electrically connected to said voltage source for supplying light to an area,
   at least one field effect transistor electrically connected to said voltage source and supplying a constant output current to said light emitting diode,
   wherein said field effect transistor is a voltage driven component having the constant output current governed by a junction voltage of said field effect transistor.

2. The system for current regulation of a light emitting diode according to claim 1, wherein said junction voltage is made constant by connecting a gate and a source of said field effect transistor together.

3. The system for current regulation of a light emitting diode according to claim 1, wherein a resistor is electrically connected between said gate and said source to create a predetermined nonzero gate-source voltage.

4. The system for current regulation of a light emitting diode according to claim 1, wherein said gate and said source are electrically connected to create a substantially zero gate-source voltage.

5. The system for current regulation of a light emitting diode according to claim 1, wherein a current supplied to said light emitting diode is limited by a maximum output current value defined the output voltage of the field effect transistor set by a gate-source voltage.

6. The system for current regulation of a light emitting diode according to claim 1, wherein said field effect transistor allows current to pass as long as said current is no greater than a maximum output current value defined the output voltage of the field effect transistor set by a gate-source voltage.

7. The system for current regulation of a light emitting diode according to claim 1, wherein an average current delivered to said light emitting diode is proportional to a maximum output current value defined the output voltage of the field effect transistor set by a gate-source voltage.

8. The system for current regulation of a light emitting diode according to claim 1, wherein said field effect transistor is disposed upstream of said light emitting diode.

9. The system for current regulation of a light emitting diode according to claim 1, wherein said field effect transistor is disposed downstream of said light emitting diode.

10. The system for current regulation of a light emitting diode according to claim 1, wherein an optional resistor may be electrically connected between said gate and said source.

11. The system for current regulation of a light emitting diode according to claim 1, wherein at least two field effect transistors are electrically connected to said voltage source and said light emitting diode.

* * * * *